United States Patent
Aritake

(12) 
(10) Patent No.: US 6,786,007 B2
(45) Date of Patent: Sep. 7, 2004

(54) PROCESS FOR MANUFACTURING WEATHER STRIP

(75) Inventor: Masanori Aritake, Ichinomiya (JP)

(73) Assignee: Toyoda Gosei Co, Ltd., Aichi-ken (JP)

( * ) Notice: Subject to any disclaimer, the term of this patent is extended or adjusted under 35 U.S.C. 154(b) by 0 days.

(21) Appl. No.: 10/412,346

(22) Filed: Apr. 14, 2003

(65) Prior Publication Data

US 2003/0188491 A1 Oct. 9, 2003

Related U.S. Application Data

(62) Division of application No. 09/621,684, filed on Jul. 21, 2000, now Pat. No. 6,571,514.

(30) Foreign Application Priority Data

Jul. 23, 1999 (JP) .............................. 11-209252

(51) Int. Cl.[7] .................................. B28B 5/00
(52) U.S. Cl. .................. 49/506; 264/250; 264/255
(58) Field of Search ............... 49/506, 490.1, 49/498.1, 479.1; 264/250, 254, 259, 255, 261, 267, 268

(56) References Cited

U.S. PATENT DOCUMENTS

| | | | |
|---|---|---|---|
| 3,165,793 A | | 1/1965 | Lynch |
| 3,958,369 A | * | 5/1976 | Mathellier .................. 49/479.1 |
| 4,183,778 A | * | 1/1980 | Mesnel ........................ 156/245 |
| 4,538,380 A | | 9/1985 | Colliander |
| 4,884,370 A | | 12/1989 | Nozaki et al. |
| 4,910,919 A | | 3/1990 | Kisanuki et al. |
| 4,964,620 A | * | 10/1990 | Omura et al. ................ 264/261 |
| 4,977,706 A | * | 12/1990 | Kisanuki .................... 49/479.1 |
| 4,986,947 A | * | 1/1991 | Shigeki et al. ............... 264/250 |
| 5,127,193 A | * | 7/1992 | Okada et al. ............... 49/495.1 |
| 5,143,772 A | | 9/1992 | Iwasa |
| 5,155,938 A | * | 10/1992 | Nozaki ......................... 49/441 |
| 5,258,157 A | | 11/1993 | Nozaki et al. |
| 5,269,101 A | * | 12/1993 | Nozaki et al. ............. 49/479.1 |
| 5,374,386 A | * | 12/1994 | Nagata ........................ 264/145 |
| 5,407,628 A | * | 4/1995 | Nozaki et al. .............. 264/261 |
| 5,511,343 A | | 4/1996 | Guillon |
| 5,538,578 A | | 7/1996 | Sugawara et al. |
| 5,711,907 A | * | 1/1998 | Nozaki et al. .............. 264/138 |
| 5,779,956 A | * | 7/1998 | Hollingshead et al. ....... 264/138 |
| 5,972,268 A | * | 10/1999 | Nakajima et al. ........... 264/138 |
| 6,007,753 A | * | 12/1999 | Nagata ........................ 264/138 |
| 6,103,168 A | * | 8/2000 | Kelly .......................... 264/259 |
| 6,115,969 A | * | 9/2000 | Nozaki ....................... 49/479.1 |
| 6,250,018 B1 | | 6/2001 | Kawai et al. |

FOREIGN PATENT DOCUMENTS

| | | |
|---|---|---|
| EP | 0449 520 A1 | 10/1991 |
| JP | A-11-129765 | 5/1999 |
| JP | A-11-240394 | 7/1999 |

\* cited by examiner

*Primary Examiner*—Gregory J. Strimbu
(74) *Attorney, Agent, or Firm*—Posz & Bethards, PLC

(57) ABSTRACT

A process for manufacturing a weather strip comprising the steps of setting an end portion of an extruded portion in a mold cavity, injecting a semi-rigid resin material into the cavity to form an attachment portion of a molded portion to integrally connect the attachment portion of the molded portion to an attachment portion of the extruded portion, and injecting thereafter a soft or sponge thermoplastic elastomer material into the cavity to form a sealing portion of the molded portion to integrally connect the sealing portion of the molded portion to a sealing portion of the extruded portion.

4 Claims, 9 Drawing Sheets

F I G. 2
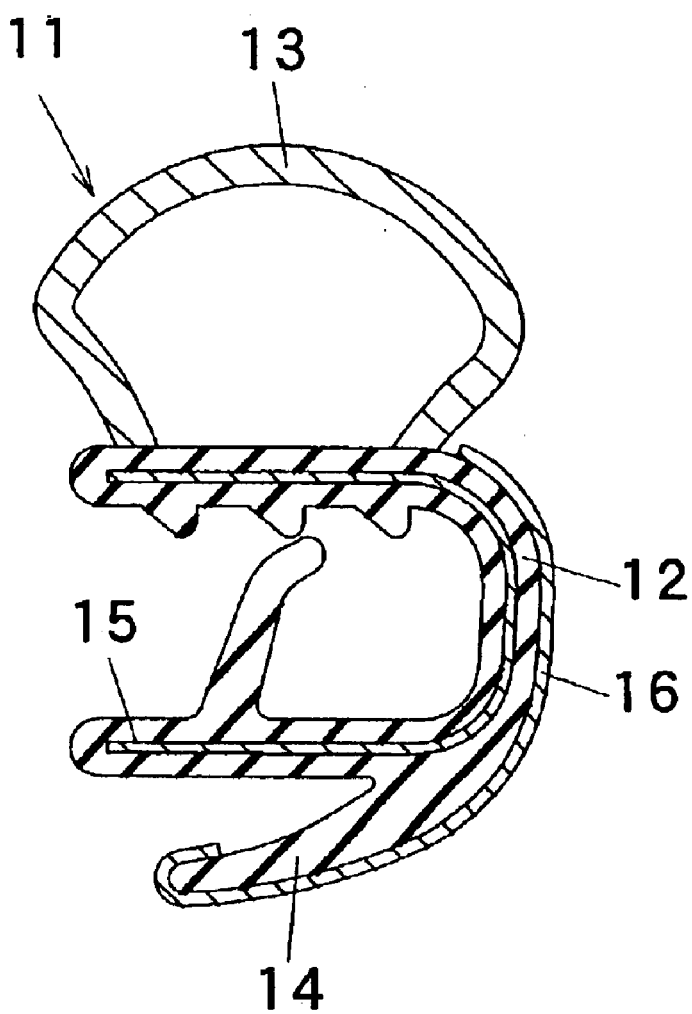

PROCESS FOR MANUFACTURING WEATHER STRIP

The present application is a division of application Ser. No. 09/621,684, filed on Jul. 21, 2000, now U.S. Pat. No. 6,571,514 entitled WEATHER STRIP AND PROCESS FOR MANUFACTURING THE SAME, which is based upon and claims the benefit of Japanese Patent Application No. 11-209252, filed on Jul. 23, 1999, the contents of which are incorporated herein by reference.

BACKGROUND OF THE INVENTION

1. Field of the Invention

The present invention relates to a weather strip including a molded portion and an extruded portion, wherein the molded portion is integrally formed on the end of the extruded portion.

2. Description of Related Art

FIGS. 5 to 8 show a conventional opening trim 50 of a weather strip. The opening trim 50 is formed by connecting integrally an end portion of a first extruded portion 51a to an end portion of a molded portion 61 and connecting the opposite end portion of the molded portion 61 to a second extruded portion 51b linearly. The symbol "S" designates a borderline, or an outline of the connecting end portions between the extruded portions 51a and 51b and the molded portion 61. Extruded portions 51a and 51b are substantially same components and will be referred to generically as extruded portion 51.

The extruded portion 51 shown in FIG. 7 and the molded portion 61 shown in FIG. 8 comprise attachment portions 52 and 62, respectively, having a generally U-shaped cross section. Attachment portions 52 and 62 attach to a flange 2 at the periphery of a door opening of an automobile body 1, as shown in FIG. 9. Further, the extruded portion 51 and the molded portion 61 comprises a hollow sealing portion 53 and 63, respectively, which are deformable elastically under the pressing of a door 3 when the door 3 is closed. Further, either extruded portion 51a or 51b may include a covering lip portion 54 protruding from the attachment portion 52 and covering the edge of an inner garnish (not shown). The conventional opening trim 50 shown in FIGS. 5 to 8 is also illustrated within dotted circle A depicted in FIG. 9.

The extruded portion 51 in FIG. 7 is integrally formed by co-extrusion molding the attachment portion 52, the hollow sealing portion 53 and the covering lip portion 54. A solid ethylene-propylene-diene copolymer (EPDM) rubber forms the attachment portion 52 and the covering lip portion 54, and a sponge EPDM rubber forms the hollow sealing portion 53. A metal insert 55, which may be made of separable pieces, is embedded in the attachment portion 52. A decorative cover 56, extending from the attachment portion 52 to the covering lip portion 54, is formed on the outer surface of the extruded portions 51a and 51b by thermal fusion bonding of a resin film, a thermoplastic elastomer film or a piece of fabric (cloth) after the completion of the extrusion molding process.

The attachment portion 62 and the hollow sealing portion 63 are molded from a solid EPDM rubber to integrally form the molded portion 61 shown in FIG. 8. More specifically, the end portions of the two extruded portions 51a and 51b are held in a metal mold (not shown), whereby the end portions of the extruded portions 51a and 51b are set facing a cavity of the metal mold. Then, a solid EPDM rubber material is injected into the cavity and vulcanized to thereby form the molded portion 61. Simultaneously with this injection molding process, the extruded portions 51a and 51b are integrally connected to the resulting molded portion 61.

However, when the molded portion 61 is formed from a solid EPDM rubber material, the metal mold temperature required for the vulcanization of the rubber is as high as 180 to 200° C. Such a high metal mold temperature causes the decorative cover 56 to melt. Thus, to prevent such melting or to concealing the melting defects, the following countermeasures are employed.

(1) When the decorative cover 56 extends to the end of the extruded portion 51, the decorative cover 56 is also held within the metal mold. When the injection molding process occurs, the decorative cover 56 is also melted which causes melting flaws or holding flaws to form at the segment where the ends of the extruded portion 51 are held. Then, as shown in FIG. 5 by a double-dotted chain line, a decorative cover portion 56x at the end portion of the extruded portion 51, a part of the attachment portion 52, and the covering lip portion 54 were removed together by a stepwise cutting process. However, the stepwise cutting was an extremely troublesome process.

(2) Further, without such stepwise cutting, the decorative cover 56 is melted to form the molten flaws or holding flaws as described above. Thus, it was necessary to remove and conceal the flaws by buffing. The buffing process required extra process steps. In addition, there were other manufacturing problems, for example, in cases where a decorative cover 56 was applied with an embossed pattern, the embossed pattern was erased. Another example is in the case of a decorative cover 56 made of a fabric, the buffing process could not be applied. Furthermore, when the molded portion 61 is formed of a solid EPDM rubber, both the attachment portion 62 and a sealing portion 63 have a black color appearance due to carbon black being used as a reinforcing material for the rubber.

Then, in the case where the extruded portions 51a and 51b, positioned on both sides of the molded portion 61, include the decorative cover 56, respectively, the outer color differs from the molded portion 61 causing a deterioration in the appearance of the weather strip. Further, in a case where the molded portion 61 is formed of a solid EPDM rubber, the attachment portion 62 and the sealing portion 63 are formed of an identical material. So, if the design emphasis is placed on the softness of the rubber for sealing of the sealing portion 63, the rubber material may be made too soft. As a result, the gripping force of the attachment portion 62 to the flange is weakened. On the other hand, if the design emphasis is placed on the gripping force of the flange and the rubber material may be made too hard, the sealing quality and door closing capability of the weather strip deteriorated. Accordingly, it was difficult to design a weather strip while establishing a balance between the sealing quality and the gripping force to the flange.

SUMMARY OF THE INVENTION

It is an object of the invention to form a molded portion at a low temperature, that does not contain molten flaws or holding flaws on an extruded portion by forming a sealing portion of the molded portion from a soft or sponge thermoplastic elastomer (hereinafter referred to as TPE), and forming an attachment portion of the molded portion from a semi-rigid resin. This configuration is designed to obtain a load necessary for the elastic deformation of the sealing portion of the molded portion by forming the sealing portion with a soft or sponge TPE material, and to obtain the required gripping force of the molded portion by forming the attachment portion with the semi-rigid resin material.

It is another object of the invention to unify the tone and improve the appearance of the entire weather strip connected in series by making the color of the semi-rigid resin of the attachment portion of the molded portion identical to the color of a decorative cover of the extruded portion.

A first invention resides in a weather strip comprising an extruded portion and a molded portion which is integrally connected to an end portion of the extruded portion. The extruded portion comprises a sealing portion formed by extrusion molding a sponge rubber, soft TPE or sponge TPE and an attachment portion having a separable core member embedded therein and formed by co-extrusion molding from a solid rubber, low foamed rubber or TPE. The molded portion comprises a sealing portion formed of a soft TPE or sponge TPE and an attachment portion formed of a semi-rigid resin. The semi-rigid resin employed within the present invention has a hardness such that it does not lose its own shape after the molding process, and the concept of this semi-rigid resin also encompasses a thermoplastic elastomer.

A second invention resides in a process for manufacturing a weather strip comprising an extruded portion and a molded portion wherein the molded portion is integrally connected to an end portion of the extruded portion. The process comprises the steps of setting the end portion of the extruded portion in a mold cavity. The extruded portion includes a sealing portion, formed by extrusion molding a sponge rubber, soft TPE or sponge TPE, and an attachment portion, having a separable core member embedded and formed by co-extrusion molding from a solid rubber, low foamed rubber or TPE. Then, a semi-rigid resin material is injected into the mold cavity to form an attachment portion of the molded portion to integrally connect the attachment portion of the molded portion to the attachment portion of the extruded portion. Next, a soft or sponge TPE material is injected into the mold cavity to form a sealing portion of the molded portion to integrally connect the sealing portion of the molded portion to the sealing portion of the extruded portion.

In either the first or second invention, the extruded portion may comprise a covering lip portion, which is formed integrally to the attachment portion of the extruded portion and protruding therefrom. When the extruded portion further comprises a decorative cover formed of a resin, TPE or foamed material thereof and when the decorative cover is formed on the outer surface of the attachment portion or the covering lip portion of the extruded portion, the decorative cover can extend as far as the terminal edge of the end of the extruded portion without requiring stepwise cutting. In such a case, it is preferable that the metal mold temperature is set to a temperature that does not melt the decorative cover. The metal mold temperature is preferably 60° C. to 80° C.

In the first invention, the TPE for the sealing portion of the molded portion preferably has a Shore A type hardness of 30° to 60°. In contrast, the semi-rigid resin for the attachment portion of the molded portion preferably has a Shore D type hardness of 30° to 65°. The decorative cover and the attachment portion of the molded portion preferably have an identical color. No core member is embedded in the attachment portion of the molded portion.

In either the first or second invention, the molded portion may be formed in a linear shape or a curved shape.

A solid rubber, low foamed rubber or TPE may be used as a molding material for the attachment portion of the extruded portion as in the conventional case. An EPDM solid rubber or EPDM low foamed rubber having a foaming ratio of 10% to 25% is preferable to use the material for the attachment portion of the extruded portion. A sponge rubber or soft or sponge TPE is applicable as a molding material for the sealing portion of the extruded portion as in the conventional case. "Rubber" embraces an EPDM rubber, while "soft or sponge TPE" embraces an olefin-based TPE (TPO) and styrene-based TPE (SBC). Especially, a TPO is preferably used. The sealing portion is a hollow or a lip. Especially, a hollow sealing portion is preferably used.

A soft or sponge TPE is applicable as a molding material for the sealing portion of the molded portion. "TPE" embraces an olefin-based TPE (TPO) and styrene-based TPE (SBC). Especially, a soft TPO is preferably used from the standpoint of adhesion with the attachment portion of the extruded portion or the molded portion. As a molding material for the attachment portion of the molded portion, an olefin-based resin such as polyethylene or polypropylene having a Shore D type hardness of 30° to 65° may be used for example. Especially, a polyethylene resin is preferably used from the standpoint of adhesion relative to EPDM as an olefin-based rubber.

As the resin for the decorative cover, a polyolefin resin such as polyethylene or polypropylene can be used for example. On the other hand, TPO and SBC or the like can be exemplified as the TPE for the decorative cover. Moreover, a foamed material of the resin or TPE can also be used. It is preferred that a pattern such as an embossed pattern is illustrated on the surface of the decorative cover. Of course, when the pattern is formed, a design of an identical pattern is also provided on the outer surface for the attachment portion and/or the covering lip portion of the molded portion.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrated and not seen to limit the scope of the invention.

BRIEF DESCRIPTION OF THE DRAWINGS

FIG. 2 is a cross-sectional view taken along the line II—II in FIG. 1;

DETAILED DESCRIPTION OF THE PREFERRED EMBODIMENTS

Figure 1:
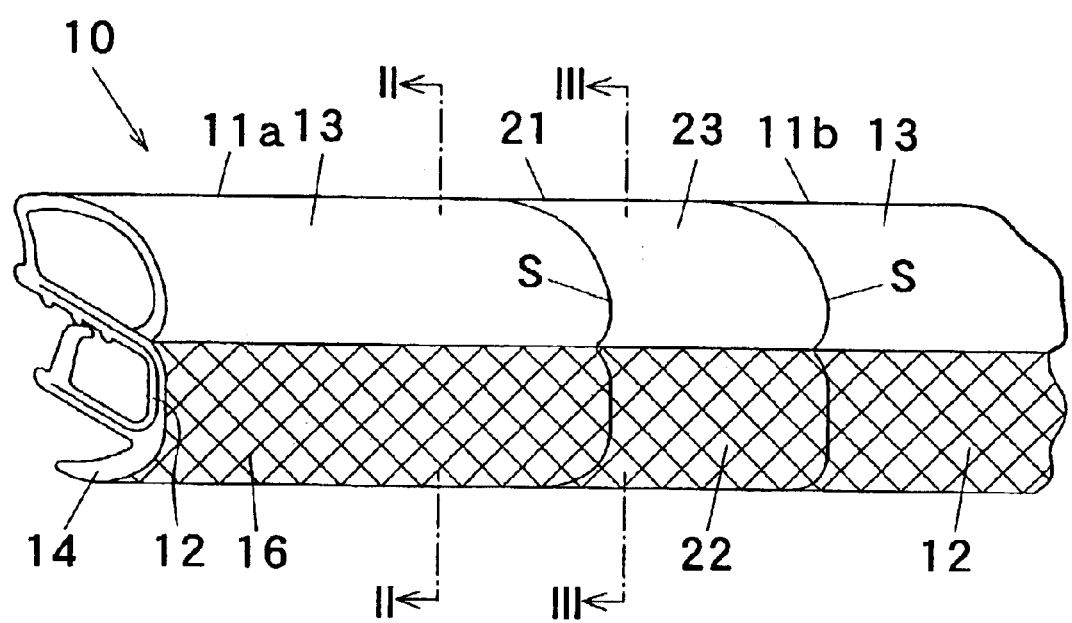
FIG. 1 is a perspective view showing a linear connection section of an opening trim according to a first embodiment of the invention.

A first embodiment of the present invention will now be described with reference to FIGS. 1 to 3. An opening trim 10 of a weather strip is formed by connecting integrally an end portion of a first extruded portion 11a to an end portion of a molded portion 21 and connecting the opposite end portion of the molded portion to a second extruded portion 11b linearly. The symbol "S" designates a borderline, or an outline of the connecting end portions between the extruded portions 11a and 11b and the molded portion 21. The opening trim 10 of this first embodiment represents a portion shown in a dotted circle B in FIG. 9. Extruded portions 11a and 11b are substantially same components and will be referred to generically as extruded portion 11.

Figure 3:
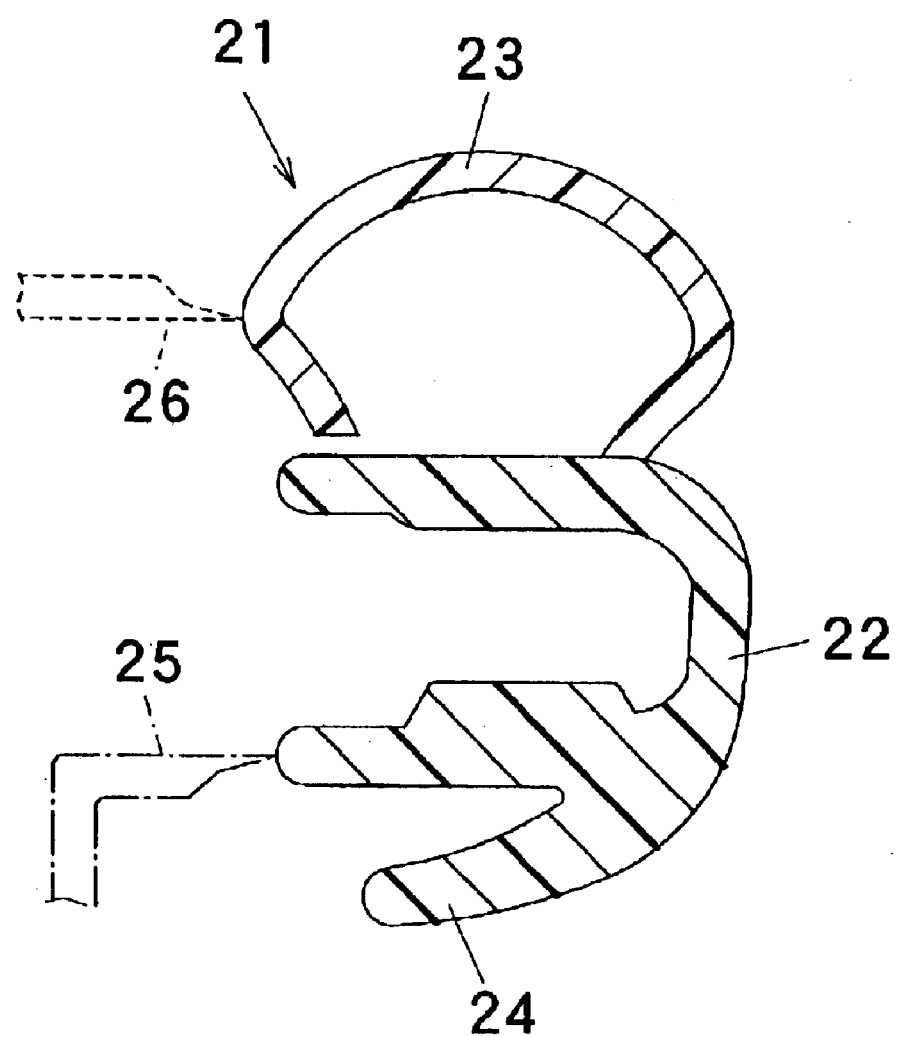
FIG. 3 is a cross-sectional view taken along the line III—III in FIG. 1.
Figure 5:
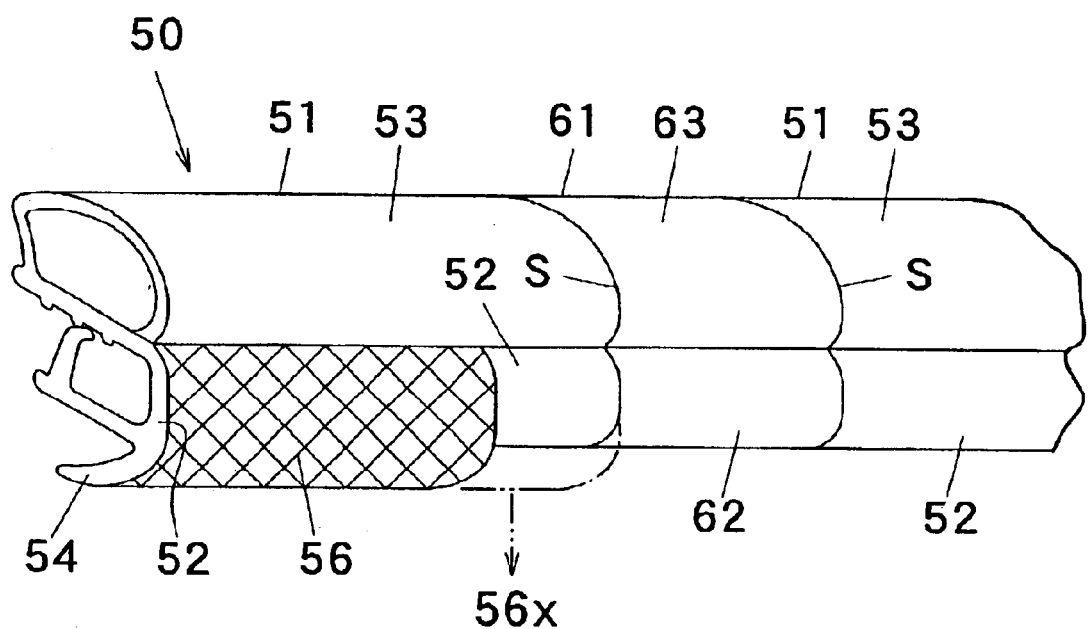
FIG. 5 is a perspective view partially showing a conventional opening trim as viewed from the non-opening side of an attachment portion.
Figure 6:
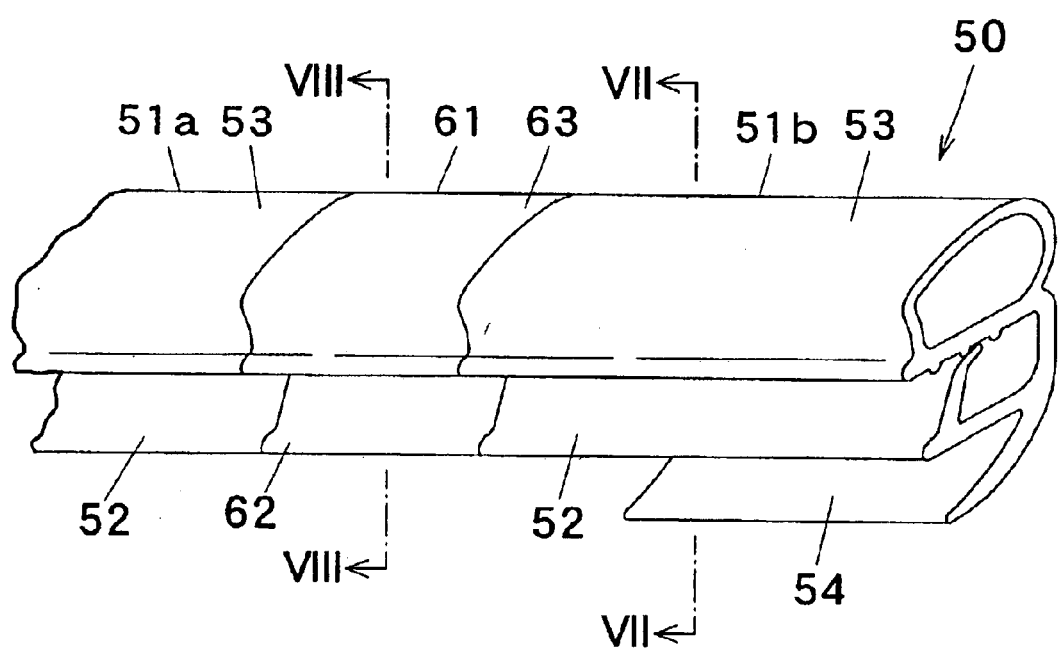
FIG. 6 is a perspective view partially showing the same opening trim, illustrated in FIG. 5 and as viewed from the opening side of the attachment portion.
Figure 7:
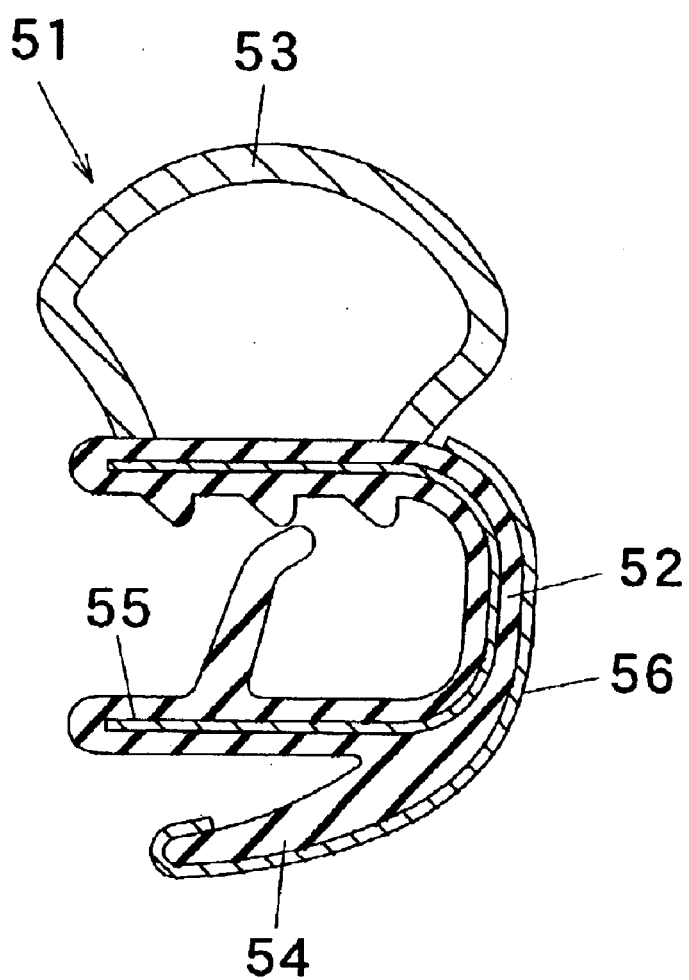
FIG. 7 is a cross-sectional view taken along the line VII—VII in FIG. 6.
Figure 8:
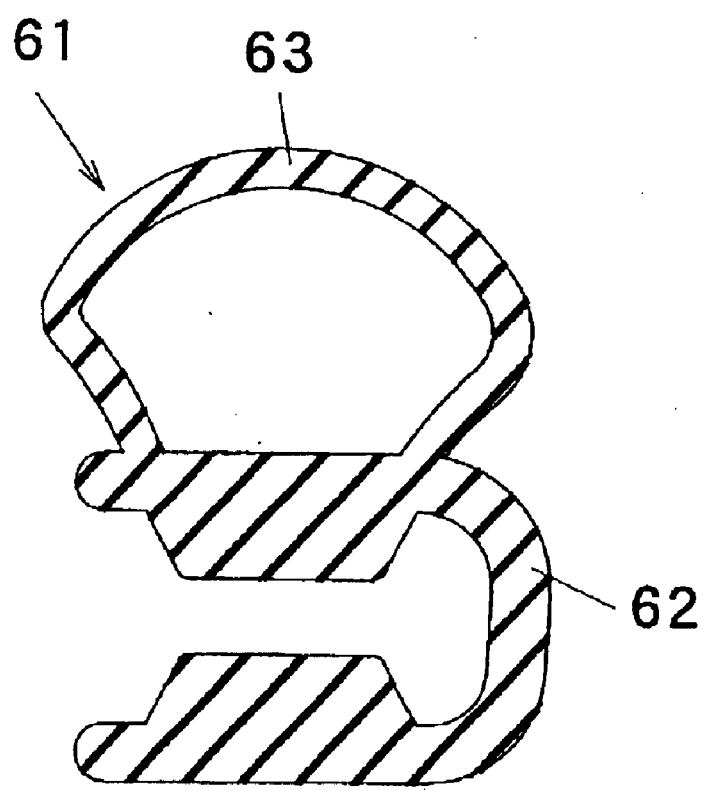
FIG. 8 is a cross-sectional view taken along the line VIII—VIII in FIG. 6.
Figure 9:
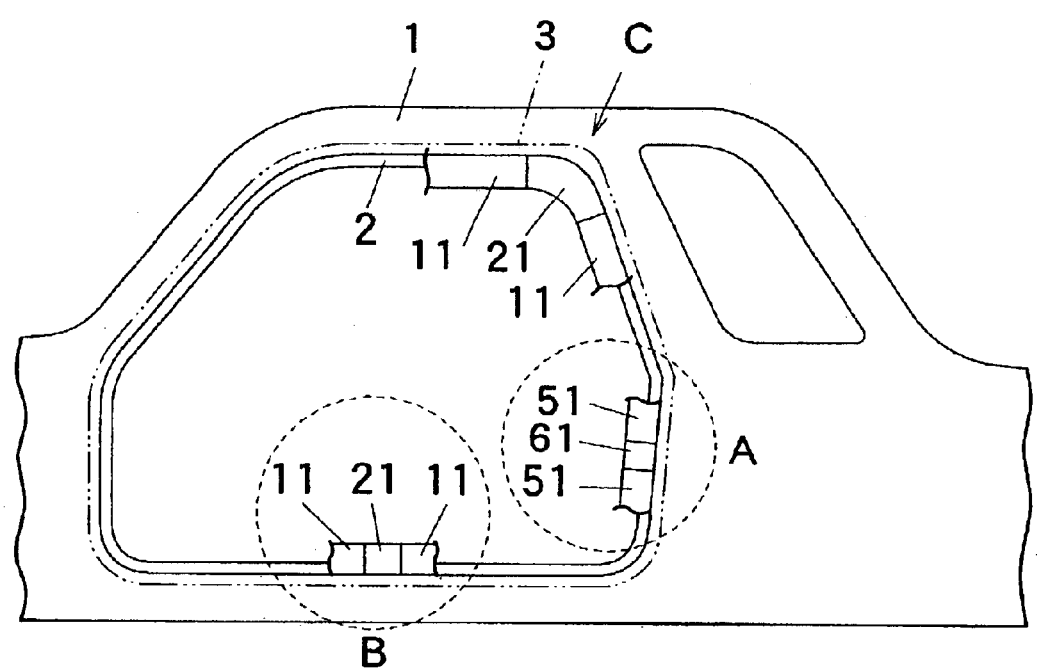
FIG. 9 is a schematic view of an automobile to which an opening trim is attached.

The extruded portion 11 in FIG. 2 and the molded portion 21 in FIG. 3 comprises an attachment portion 12 and 22, respectively, having a generally U-shaped cross section. Attachment portions 12 and 22 attach to a flange 2 at the periphery of a door opening of an automobile body 1, as shown in FIG. 9. Further, the extruded portion 11 and the molded portion 21 comprises a hollow sealing portion 13 and 23, respectively, which are deformable elastically under the pressing of a door 3 when the door 3 is closed. Still further, the extruded portion 11 and the molded portion 21 include a covering lip portion 14 and 24, respectively, protruding from the corresponding attachment portion 12 or 22 and covering the edge of an inner garnish (not shown). The covering lip portion 14 of the extruded portion 11 may be provided on only one of the extruded portion 11a or 11b as disclosed in the conventional opening trim shown in FIG. 5.

The extruded portion 11 shown in FIG. 2 is integrally formed by co-extrusion molding a solid EPDM rubber to form the attachment portion 12 and the covering lip portion 14 and a sponge EPDM rubber to form the hollow sealing portion 13. A metal insert 15, which may be separable pieces, is embedded in the attachment portion 12. A decorative cover 16, extending from the attachment portion 12 to the covering lip portion 14, is formed on the outer surface of the extruded portion 11 by bonding a TPE film after the completion of the extrusion molding process.

The molded portion 21 shown in FIG. 3 is formed by integrally forming the attachment portion 22 and the covering lip portion 24 made of a polyethylene resin as a semi-rigid resin having a Shore D type hardness of about 40°. Further, the molded portion 21 is formed by integrally forming the hollow sealing portion 23 consisting of a soft TPO having Shore A type hardness of about 50°. Specifically, the end portions of extruded portions 11a and 11b are held on a metal mold (not shown), by the end portions of the extruded portions 11a and 11b that face a cavity of the metal mold.

The attachment portion 22, the covering lip portion 24 and the hollow sealing portion 23 are integrally formed together. Initially, a polyethylene resin material for forming the attachment portion 22 and the covering lip portion 24 is injected from a gate 25 into the cavity, as shown by a dotted chain line in FIG. 3. Then, a soft TPO is injected from a gate 26 into the cavity to form the hollow sealing portion 23, as shown by a dotted line in FIG. 3. The injection molding process of gate 25 and 26 occur almost simultaneously. Concurrently with this injection molding process, the extruded portions 11a and 11b are integrally connected to the resulting molded portion 21.

When the Shore D type hardness of the semi-rigid resin for the attachment portion 22 of the molded portion 21 is less than 30°, the shape of the attachment portion 22 cannot be maintained. On the other hand, when the Shore D type hardness is higher than 65°, the covering lip portion 24 of the molded portion 21 becomes stiff which is undesirable because the covering lip portion 24 will not deform at the portion that connects with the covering lip portion 14 of the extruded portion 11. Furthermore, when the Shore A type hardness of the TPE for the hollow sealing portion 23 of the molded portion 21 is lower than 30°, the device is too soft to obtain the required sealing characteristics. On the other hand, when Shore A type hardness is higher than 60°, the force needed to close the door increases, which is also undesired.

When the molded portion 21 is formed, the metal mold temperature can be lowered to 60° C. to 80° C. since neither the polyethylene resin nor the soft TPO needs to be vulcanized, and the decorative cover 16 of the extruded portion 11 in the metal mold is not melted at such a low temperature. Therefore, according to this embodiment, the decorative cover 16 can extend as far as the terminal edge of the end portion of the extruded portion 11 without requiring stepwise cutting. As a result, although the decorative cover 16 and the end portion of the extruded portion 11 are held together in the metal mold, buffing of the decorative cover 16 is not necessary since the decorative cover 16 is not scarred with melting flaws or holding flaws.

Furthermore, as described in the "Related Art" section, when the stability of the gripping force of the attachment portion to the flange is taken into consideration and when the hollow sealing portion 23 of the molded portion 21 is formed of a solid TPO having an elastic modulus greater than that of sponge EPDM rubber and having the same hardness as the attachment portion, the load required for elastic deformation of the hollow sealing portion 23 exceeds the load of the hollow sealing portion 13, which is formed by extrusion molding from the sponge EPDM rubber. This increased load may possibly increase the force needed to close the door.

However, according to the first embodiment of the present invention, the attachment portion 22 of the molded portion 21 is formed of a polyethylene resin having a hardness that guarantees the attaching stability of the gripping force of the attachment portion 22 to the flange 2. In addition, only the load necessary for the elastic deformation of the hollow sealing portion 23 is taken into consideration when the hollow sealing portion 23 of the molded portion 21 is formed of a soft TPO. Thus, the load of the hollow sealing portion 23 is generally equal to the load of the hollow sealing portion 13 of the extruded portion 11. Therefore, there is no difference of the load required for the elastic deformation between the hollow sealing portion 13 of the extruded portion 11 and the hollow sealing portion 23 of the molded portion 21. Thus, the sealing property at the boundary region improves, and the door closing force decreases, which improves the door closing performance.

Further, since the attachment portion 22 of the molded portion 21 is formed of a polyethylene resin having a hardness that ensures the attaching stability to the flange 2, it is not necessary to bury the metal insert 15 inside the attachment portion 22, as embedded in the extruded portion 11. Consequently, the weight of the opening trim 10 decreases. Further, since the tone of the polyethylene resin is blended to match identically the hue of the decorative cover 16 of the extruded portion 11, the entire opening trim forms a uniform appearance to aesthetically enhance the device. Moreover, in a case where an embossed or other similar pattern is shaped on the surface of the decorative cover 16 of the extruded portion 11, an identical pattern can be shaped by transferring the design pattern from the metal mold onto the outer surface of the attachment portion 22 and the covering lip portion 24 of the molded portion 21.

Furthermore, since the polyethylene resin and soft TPO used to form the molded portion 21 and the EPDM rubber for the extruded portion 11 consist of an olefin-based polymeric material, the SP (Solubility Parameter) of these components are closer to each other. Additionally, the material properties of the extruded portion 11 and the molded portion 21 facilitate the fusion bonding connection between these two components. Also, a satisfactory fusion bonding connection can be made formed between the attachment portion 22 and the hollow sealing portion 23 when the molded portion 21 is produced.

Figure 4:
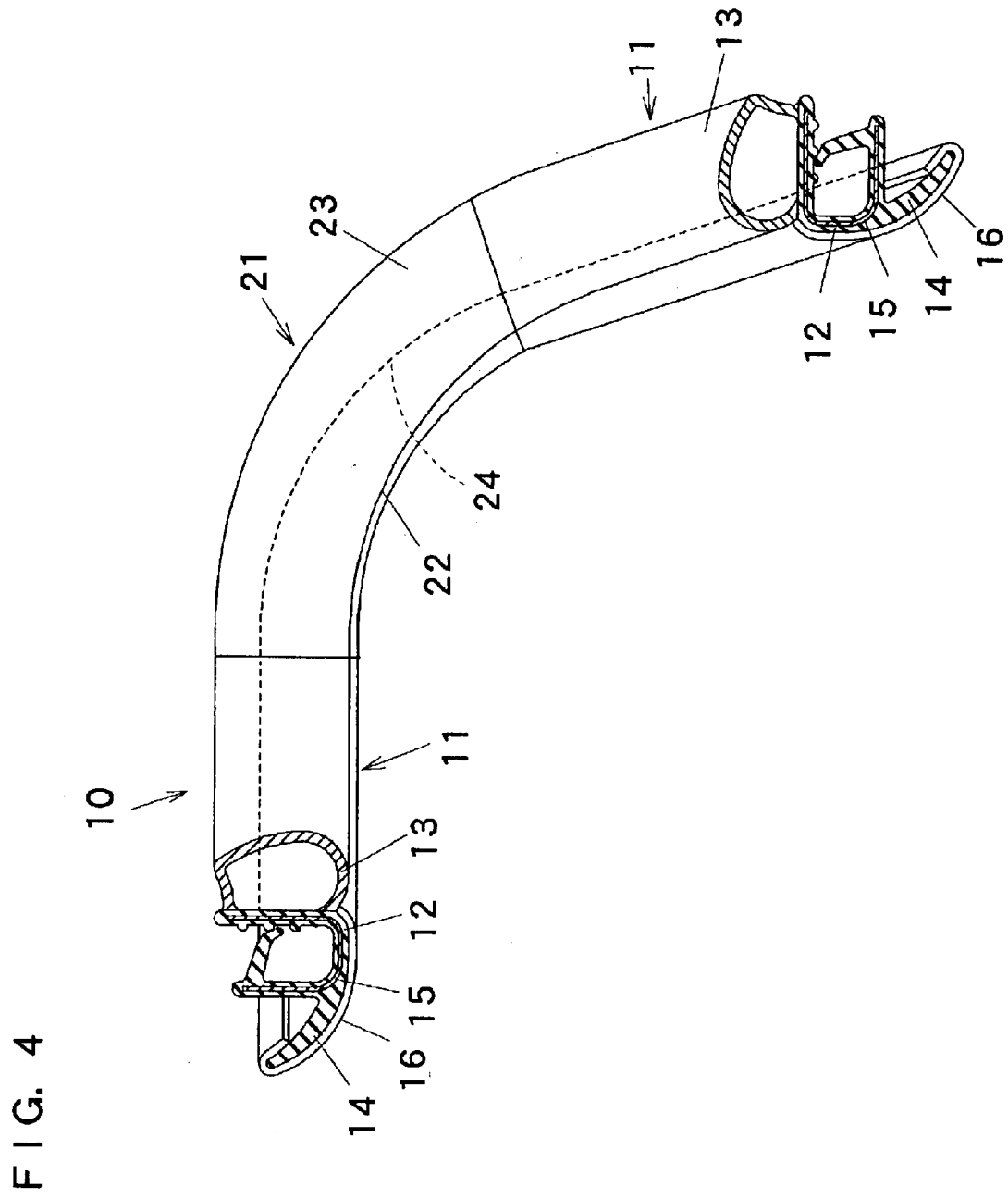
FIG. 4 is a perspective view showing a corner connecting section of an opening trim according to a second embodiment of the invention.

FIG. 4 is a perspective view showing a corner connection section (portion C in FIG. 9) of an opening trim 10 illustrating a second embodiment of the invention. The opening trim 10 of the second embodiment is basically identical to the opening trim 10 of the first embodiment except for the following points. Namely, the opening trim 10 of the first embodiment is attached to a linear part of the automobile body. On the other hand, the opening trim 10 of the second embodiment is attached to a corner of the automobile body. Accordingly, the opening trim 10 of the second embodiment provides identical function and effect as those of the opening trim 10 of the first embodiment.

The curved-shaped portion of opening trim 10 of the second embodiment comprises an attachment portion 22 and a covering lip portion 24 made of a semi-rigid polyethylene resin. In contrast, a conventional opening trim, which is attached to a corner of an automobile body, uses the following technique for obtaining a required curved shape along the corner of the automobile body (see Japanese Patent Application Laid-Open Specification No. 11-240394). Namely, a part of a hollow sealing portion 13 is first cut off remaining its corresponding attachment portion 12 of an extruded portion 11. Next, the extruded portion 11 is set in a molding apparatus with being curved in accordance with the corner shape of the automobile body. Then, a rubber material is injected into the cut off part of the hollow sealing portion 13, thereby forming a molded sealing portion. However, according to the conventional opening trim, there was a concern that the curved attachment portion tends to resume its original linear shape after it is attached to the body which causes it to displace itself from the flange. Accordingly, the opening trim of the second embodiment is excellent at retaining its curved shape and forming its attachment connections compared with the opening trim that uses the conventional fabrication technique.

The present invention is not restricted to the embodiments described above, but it can be changed and embodied properly within such a range as not departing from the gist of the invention, for example, as shown below.

(1) The extruded portion 11 may be integrally formed by co-extrusion molding from a low foamed EPDM rubber or TPO, which forms the attachment portion 12 and the covering lip portion 14, and a soft TPO or sponge TPO, which forms the hollow sealing portion 13.

(2) The decorative cover 16 may also be formed of a resin film or a foamed resin or TPE film.

(3) The present invention may be embodied into various types of weather strips used for sealing numerous devices such as a trunk, a back door or a sliding roof having a sealing portion on which an opening/closing member is contacted.

As many apparently widely different embodiments of this invention may be made without departing from the spirit and scope thereof, it is to be understood that the invention is not limited to the specific embodiments thereof except as defined in the appended claims.

What is claimed is:

1. A process for manufacturing a weather strip comprising an extruded portion and a molded portion which is integrally connected to an end portion of said extruded portion, comprising the steps of:
  setting the end portion of said extruded portion in a mold cavity, said extruded portion comprising a sealing portion formed by extrusion molding from a sponge rubber, soft thermoplastic elastomer or sponge thermoplastic elastomer and an attachment portion having a core member embedded therein and formed by co-extrusion molding from a solid rubber, low foamed rubber or thermoplastic elastomer;
  injecting a semi-rigid resin material into said cavity to form an attachment portion of said molded portion to integrally connect said attachment portion of said molded portion to said attachment portion of said extruded portion; and
  injecting thereafter a soft or sponge thermoplastic elastomer material into said cavity to form a sealing portion of said molded portion to integrally connect said sealing portion of said molded portion to said sealing portion of said extruded portion.

2. A process according to claim 1, wherein said extruded portion further comprises a decorative cover formed of a resin, thermoplastic elastomer or foamed material thereof, said decorative cover is formed on the outer surface of said attachment portion of said extruded portion and exists as far as the terminal edge of tho end portion of said extruded portion, and wherein the mold temperature is set to a temperature at which said decorative cover will not melt.

3. A process according to claim 2, wherein the mold temperature is from 60 to 80° C.

4. A process according to claim 1, wherein said molded portion is formed in a curved shape.

* * * * *